United States Patent
Mengibar et al.

(10) Patent No.: US 11,532,299 B2
(45) Date of Patent: *Dec. 20, 2022

(54) LANGUAGE MODEL BIASING MODULATION

(71) Applicant: Google LLC, Mountain View, CA (US)

(72) Inventors: Pedro J. Moreno Mengibar, Jersey City, NJ (US); Petar Aleksic, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/896,779

(22) Filed: Jun. 9, 2020

(65) Prior Publication Data

US 2020/0302916 A1  Sep. 24, 2020

Related U.S. Application Data (63) Continuation of application No. 16/381,167, filed on Apr. 11, 2019, now Pat. No. 10,714,075, which is a continuation of application No. 15/874,075, filed on Jan. 18, 2018, now Pat. No. 10,297,248, which is a continuation of application No. 15/263,714, filed on Sep. 13, 2016, now Pat. No. 9,886,946, which is a continuation of application No. 14/673,731, filed on Mar. 30, 2015, now Pat. No. 9,460,713.

(51) Int. Cl.
| | |
|---|---|
| *G10L 15/00* | (2013.01) |
| *G10L 15/07* | (2013.01) |
| *G10L 15/197* | (2013.01) |
| *G10L 15/183* | (2013.01) |
| *G10L 15/24* | (2013.01) |

(52) U.S. Cl.
CPC ............ *G10L 15/07* (2013.01); *G10L 15/183* (2013.01); *G10L 15/197* (2013.01); *G10L 15/24* (2013.01)

(58) Field of Classification Search
None
See application file for complete search history.

(56) References Cited

U.S. PATENT DOCUMENTS

| | | |
|---|---|---|
| 5,390,279 A | 2/1995 | Strong |
| 6,904,405 B2 | 6/2005 | Suominen |
| 7,778,816 B2 * | 8/2010 | Reynar ................. G06F 40/174 715/224 |
| 8,260,615 B1 | 9/2012 | Nakajima et al. |

(Continued)

*Primary Examiner* — Satwant K Singh
(74) *Attorney, Agent, or Firm* — Honigman LLP; Brett A. Krueger (57) ABSTRACT

Methods, systems, and apparatus, including computer programs encoded on a computer storage medium, for modulating language model biasing. In some implementations, context data is received. A likely context associated with a user is determined based on at least a portion of the context data. One or more language model biasing parameters based at least on the likely context associated with the user is selected. A context confidence score associated with the likely context based on at least a portion of the context data is determined. One or more language model teasing parameters based at least on the context confidence score is adjusted. A baseline language model based at least on the one or more of the adjusted language model biasing parameters is biased. The baseline language model is provided for use by an automated speech recognizer (ASR).

20 Claims, 4 Drawing Sheets

(56) References Cited

U.S. PATENT DOCUMENTS

| | | |
|---|---|---|
| 8,417,526 B2 | 4/2013 | Bourdon |
| 8,442,830 B2 | 5/2013 | Nakajima et al. |
| 8,762,156 B2 | 6/2014 | Chen |
| 9,171,541 B2 | 10/2015 | Kennewick et al. |
| 9,202,465 B2 | 12/2015 | Talwar et al. |
| 9,460,713 B1 * | 10/2016 | Moreno Mengibar ............... G10L 15/07 |
| 9,547,306 B2 | 1/2017 | Wuth Sepulveda et al. |
| 9,570,070 B2 | 2/2017 | Baldwin et al. |
| 9,704,483 B2 | 7/2017 | Sharif et al. |
| 9,792,281 B2 | 10/2017 | Sarikaya |
| 9,842,592 B2 | 12/2017 | Biadsy et al. |
| 9,886,946 B2 | 2/2018 | Moreno-Mengibar et al. |
| 10,297,248 B2 | 5/2019 | Moreno Mengibar et al. |
| 2005/0137868 A1 | 6/2005 | Epstein et al. |
| 2007/0124147 A1 | 5/2007 | Gopinath et al. |
| 2008/0270136 A1 | 10/2008 | Deligne et al. |
| 2012/0265528 A1 * | 10/2012 | Gruber .................... G10L 15/18 704/235 |
| 2013/0346077 A1 | 12/2013 | Mengibar et al. |
| 2014/0040748 A1 * | 2/2014 | Lemay ................ G06F 3/04817 715/728 |
| 2015/0228279 A1 * | 8/2015 | Biadsy .................. G10L 15/197 704/235 |
| 2016/0049152 A1 | 2/2016 | Kennewick et al. |
| 2017/0032781 A1 | 2/2017 | Sharif et al. |
| 2017/0256257 A1 | 9/2017 | Froelich |
| 2017/0256258 A1 | 9/2017 | Froelich |
| 2017/0256259 A1 | 9/2017 | Froelich |
| 2017/0256261 A1 | 9/2017 | Froelich |
| 2018/0144741 A1 | 5/2018 | Moreno Mengibar et al. |

* cited by examiner

LANGUAGE MODEL BIASING MODULATION

CLAIM OF PRIORITY

This patent application is a continuation of and claims priority under 35 U.S.C. § 120 from U.S. patent application Ser. No. 16/381,167, filed on Apr. 11, 2019, which is a continuation of U.S. patent application Ser. No. 15/874,075, filed on Jan. 18, 2018, which is a continuation of U.S. patent application Ser. No. 15/263,714, filed on Sep. 13, 2016, which is a continuation of U.S. patent application Ser. No. 14/673,731, filed on Mar. 30, 2015. The disclosures of these prior applications are considered part of the disclosure of this application and are hereby incorporated by reference in their entireties.

FIELD

The present specification relates to automated speech recognition (ASR).

BACKGROUND

Language models, which are components of systems such as automated speech recognition (ASR) systems, assign probabilities to sequences of text. ASR systems transcribe utterances into a series of computer readable sounds, which are then compared to a dictionary of words in a given language. The relative probabilities associated with several candidate sequences of words can be used to help select the most likely transcription of an utterance.

SUMMARY

In general, one innovative aspect of the subject matter described in this specification can be embodied in processes that modulate the extent to which language models are biased based on context data that could indicate whether a user remains associated with a specific context, or whether the user has switched to a different context. Modulating language model biasing enables an ASR system to reduce transcription word error rates, for example when the ASR system has low confidence that biasing associated with a particular context should be performed.

Language model biasing may be modulated using context data such as the time interval between a user query and user response to a presentation of results to the query, gaze tracking data indicating how the user directs attention to visual content, or data indicating that the user has switched between applications. A context selector may initially calculate a likely context based on the received context data and select a set of biasing parameters that are associated with the likely context. A biasing modulator may then calculate a context confidence score of the likely context, which represents the likelihood that the user remains within associated with the likely context based on receiving additional context data. The biasing modulator may determine, based on the context confidence score, that the likely context associated with the user has changed, and in response, interpolate the selected biasing parameters based on the additional context data. The language model biaser may then use the modulated language model parameters to bias the language model, which is provided to an automated speech recognition module for transcribing subsequent speech input.

For situations in which the systems discussed here collect personal information about users, or may make use of personal information the users may be provided with an opportunity to control whether programs or features collect personal information, e.g., information about a user's social network, social actions or activities, profession, a user's preferences, or a user's current location, or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, zip code, or state level, so that a particular location of a user cannot be determined. Thus, the user may have control over how information is collected about him or her and used by a content server.

Implementations may include one or more of the following features. For example, a computer-implemented method including receiving context data; determining a likely context associated with a user, based on at least a portion of the context data, selecting one or more language model biasing parameters based at least on the likely context associated with the user, determining a context confidence score associated with the likely context based on at least a portion of the context data, and adjusting one or more of the language model biasing parameters based at least on the context confidence score. The method also includes biasing a baseline language model based at least on one or more of the adjusted language model biasing parameters; and providing the biased language model for use by an automated speech recognizer (ASR).

Other versions include corresponding systems, apparatus, and computer programs, configured to perform the actions of the methods encoded on computer storage devices.

In some implementations, the context confidence score reflects a likelihood that the likely context remains associated with the user. In some implementations, the context confidence score associated with the likely content is determined further based at least on additional context data indicating that the user has switched to a different likely context. In some implementations, the baseline language model indicates scores associated with different n-gram sequences.

In some implementations, additional context data includes data indicating that the user has switched between applications, data indicating a time difference between a presentation of a search result and a user response to the presentation of the search result, gaze tracking data, or data indicating a user behavior in response to visible content.

In some implementations, adjusting one or more of the language model biasing parameters may include: comparing the context confidence score associated with the likely context to a threshold context confidence score value; determining, based at least on comparing the context confidence score associated with the likely context to the threshold context confidence score value, that the likely context data does not remain associated with the user; in response to determining that the likely context data does not remain associated with the user, interpolating one or more selected language model biasing parameters based on at least the likely context, and providing, for output to a language module biaser, one or more adjusted language model biasing parameters based on at least the likely context with decreased biasing weights.

In some implementations, interpolating one or more language model biasing parameters includes, reducing, by a first magnitude, based on additional context data indicating a time difference between a presentation of a search result and a user response to the presentation of the search result; or reducing, by a second magnitude, based on additional context data including gaze tracking data.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

Figure 1:
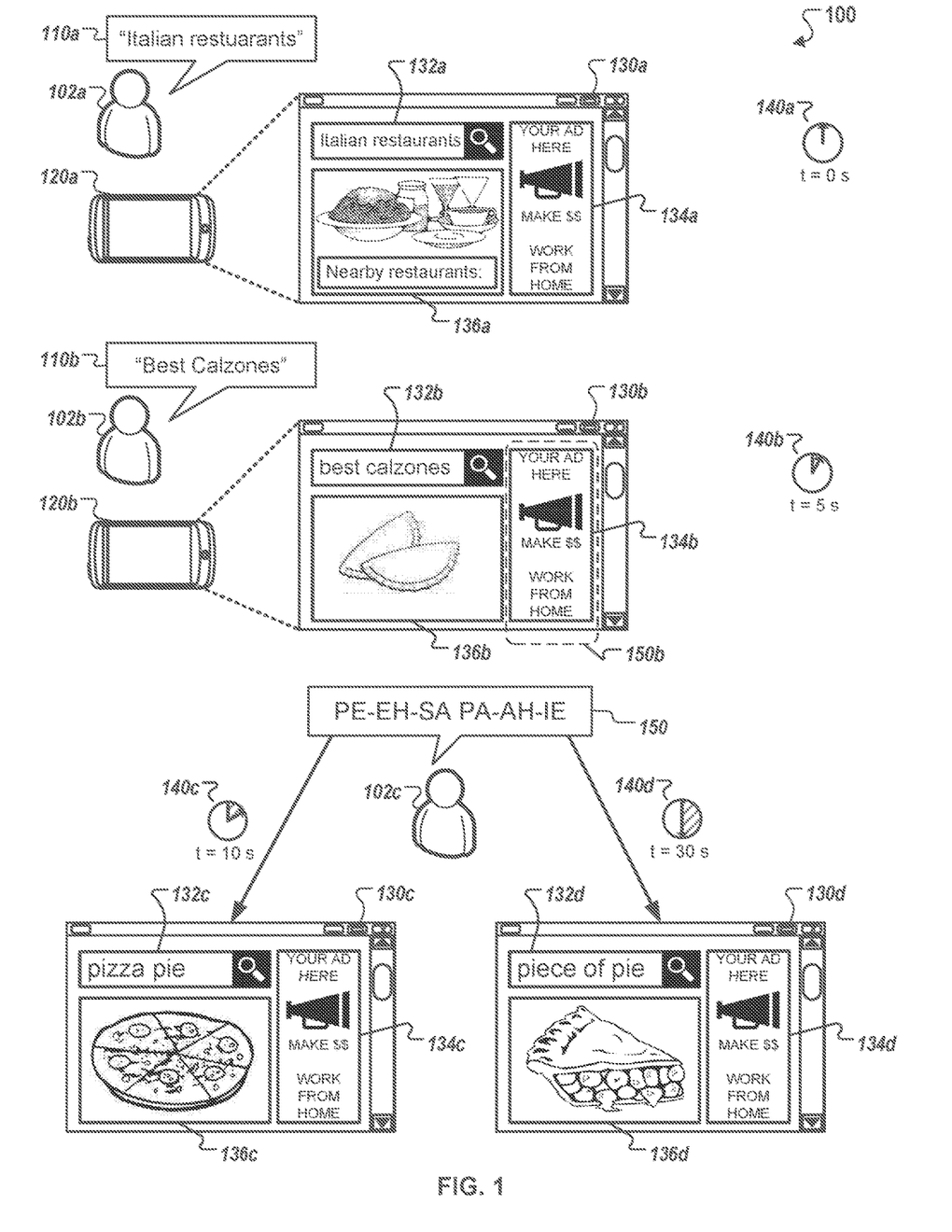
FIG 1 illustrates examples of the modulation of language model biasing.

FIG. 1 illustrates examples of the modulation of language model biasing. In this example, a user 102a issues a voice query 110a to a user device 120a, which displays a user interface 130a through an application on its screen. The user interface 130a includes a search box 132a, a content display 136a, and a banner ad 134a. The system 100 uses a timestamp 140a to track the time interval between a voice query 110a and user input on the user interface 130a. More detailed examples are provided in subsequent figures and the corresponding description.

The user device 120a may be any type of computing device that includes a microphone, such as a smartphone, tablet computer, laptop computer or desktop computer. The user interface 130a may be displayed through any mobile or desktop operating system that allows a user to provide a user query and displays visual content, e.g., search results, in response to the user query.

As illustrated in FIG. 1, the user 102a, 102b, and 102c may correspond to the same user across various timestamps 140a, 140b and 140c/140d respectively. The voice queries 110a-d, user devices 120a-d, and user interfaces 130a-d may also correspond to the same or similar components across the timestamps 140a-140d, respectively.

In the example shown in FIG. 1, the user 102a may initially submit a voice query to find Italian restaurants nearby by issuing a voice query 110a that includes the terms "Italian restaurant" to a user device 120a. In response to the voice query 110a, the user interface 130a displays a list of search results that reference nearby Italian restaurants on the content display 136a. The system 100 further obtains language model biasing parameters including the names of the restaurants displayed on the content display 136a. The system 100 uses the timestamp 140a of the voice query 110a to track the time interval between the user's initial voice query 110a and a user input in response to a presentation of search results from the voice query 110a.

After the user 110a provides the voice query 110a, the user 102b may provide a second voice query 110b that includes the terms "best calzones." The system 100 may determine that this second voice query 110b is within the likely context of the user s initial voice query 110a, based on the short time interval between time point 140a and 140b, e.g., five seconds, and that the content associated with the voice query 110a is related to the content associated with the voice query 110b, i.e., calzones are a type of Italian food. In response the system 100 may determine that the user remains within the same context as the voice query 110a and continue to bias the language model to display search results that reference calzones on the content display 136b, including for instance, image search results that are images of calzones.

After, a user 102c may provide a voice query 150 that is phonetically transcribed as "PE-EH-SA PA-AH-IE, " and which is associated with the candidate transcriptions "pizza pie" and "piece of pie." In FIG. 1, user interfaces 130c and 130d represent alternative biasing actions taken by the system 100 in response to the voice query 150. For instance, the system 100 may determine the likely context associated with the user based on the voice queries 110a-110b and input provided on user interfaces 130a-130b from time periods 140a-b in the example shown in FIG. 1. the system 100 may determine whether the user 102c remains within the context of Italian food based on the context data received by the user devices 120a-120b between the time points 140a-140b.

In one example, the system 100 may determine that the user 102c is still within the likely context of Italian food based on the interval between timestamps 140a and 140c being ten seconds long. In this example, the system 100 does not modulate language model biasing and continues to bias the language model based on the initial voice query 110a to transcribe that the voice query 150 as "pizza pie".

In some implementations, the system 100 may use additional context data provided by the user such as data indicating the amount of scrolling on the interfaces 130a-130b, or touch input provided on the content displays 136a-136b to determine the likely context of the user 102c. In these implementations, the system 100 may determine that the user is still within the likely context based on data indicating positive interactions with the displayed search results. In response, the system 100 may bias the language model to increase likelihoods of words associated with Italian food, e.g., "pizza."

In another example, the system 100 may determine that the user 102c is not within the likely context of Italian food. For instance, the system 100 may calculate a context confidence score for biasing the language model based on the initial voice query 110a. The context confidence score may represent the likelihood that the user 102c is within the context associated with voice query 110a when the user submits the voice query 150. The system may use context data such as extended time interval between timestamps 140a and 140d, e.g., thirty seconds, to calculate the confidence score based on a threshold time interval for response time. Based on determining that the interval between timestamps 140a and 140d is above the threshold, the system 100 may calculate a low context confidence score for the likely context of Italian food, which indicates that the user 102c is not within the likely context of Italian food. In this example, the system 100 may attenuate or disable language model biasing based on Italian food.

The system 100 interpolates the language model using modulated biasing parameters to transcribe the voice query 150 based on receiving context data indicating that the likely context content is no longer associated with the user 102c. For example, the system 100 may use additional context data 150b in addition to the voice queries 110a and 110b to determine whether the context associated with the user has changed since submitting the initial voice query 110a. For instance, such additional context data may include gaze tracking data that reflects eye movements from a front-side camera near the screen of the user device 120a. In such instances, if the gaze tracking data indicates that the user 102c spent more time looking at the banner ad 134b than the content display 136b, the system 100 may determine that the content display 136b does not confidently represent the likely context associated with the user. The system 100 may then attenuate or disable language model biasing based on the context display 136b to control the transcription of the voice query 150. In other instances, the system 100 may use other types of context data such as data indicating a touch input, time lapse between presentation of user content and the user response to the content, or switching between other applications on the user device 110a.

In other implementations, the system 10D may interpolate the language model used to transcribe the voice query 150 by modulating a set of biasing language model parameters that indicate the likelihoods of certain words within the language model based on receiving additional context data. For example, in response to determining that the time interval between the timestamps 140a and 140d is above a threshold value, e.g., 15 seconds, and receiving data indicating that the user 102c selected the banner 134b, the system 100 may reduce the biasing of words associated with Italian food within the language model to generate a biased language model. In this example, the system 100 may reduce the biasing parameters related to Italian food using decay factors that attenuate the associated likelihoods within the language model. In another example, the system 100 may determine that the additional context data indicates a likely context so divergent from Italian food, that the system 100 may disable biasing based on Italian food. In this example, the system 100 generates replacement biasing parameters to prevent incorrect language model biasing based on an irrelevant user context.

Figure 2:
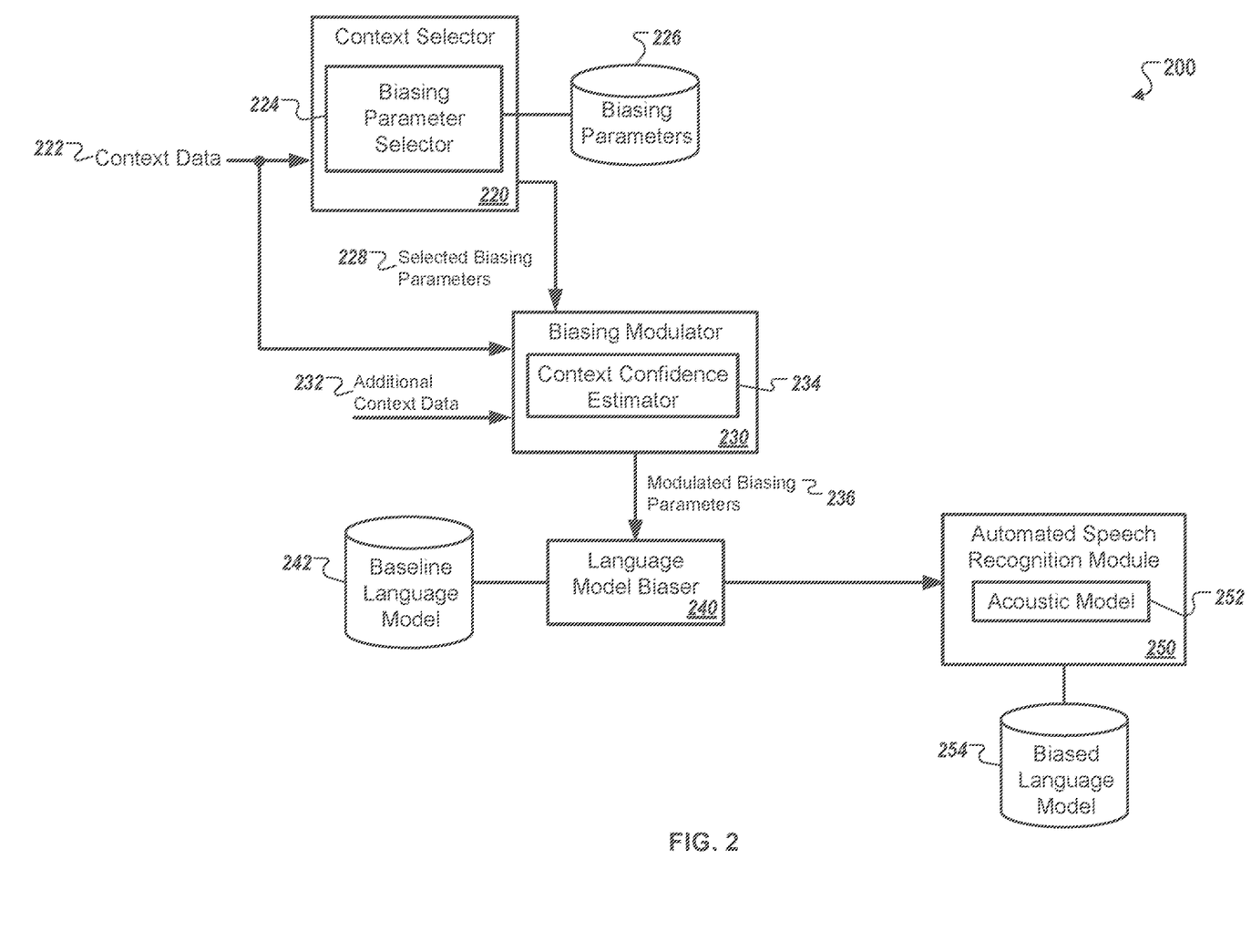
FIG. 2 illustrates an example system that may be used to perform language model biasing modulation.

FIG. 2 illustrates an example system that may be used to perform language model biasing modulation. Briefly, a context selector 220 includes a biasing parameter selector 224 that selects biasing parameters 226 based on the received context data 222. The selected biasing parameters 228 are transmitted to a biasing modulator 230, which includes a context confidence estimator 234. The biasing modulator 230 generates modulated biasing parameters 236 and may also receive additional context data 232. A language model biaser 240 selects a baseline language model 242 to bias based on the receiving the modulated biasing parameters 236. The language model biaser 240 then transmits a biased language model 254 to an automated speech recognition module 250. The acoustic model 252 uses the biased language model 254 to transcribe subsequent speech input provided by a user.

The context selector 220 includes a biasing parameter selector 224. The context selector 220 may be a computer-implemented program that processes user queries through voice queries. The user query include context data 222, which allows the context selector 220 to determine a likely context associated with the user based on the received user queries. For example, the context data 222 may include number and type of words used within the user query, or time lapses between signals, e.g., notifications on user interfaces, and user response. The likely context associated with the user may be a list of candidate topics that are correlated with the information included within the user query.

The biasing parameter selector 224 may select a set biasing parameters from a repository of biasing parameters 226 based on the likely context associated with the user. For example, in response to a user query "Italian food near me", the context selector 220 may determine that the likely context may be restaurants or food within a certain distance, e.g., one mile radius, from the user's location. The system 200 generate a list of candidate restaurants in response to the query, and the biasing parameter selector 224 may select the names of the restaurants as the biasing parameters 226 for the user query. The context selector 220 may then transmit the selected biasing parameters 228 to the biasing modulator 230.

The biasing modulator receives the transmitted selected biasing parameters 228 and includes a context confidence estimator 234 The biasing modulator may also receive context data 222 associated with the user query and additional context data 232 from subsequent user input provided after the initial user query. The context confidence estimator 234 calculates a context confidence score, which indicates the likelihood that the likely context remains associated with the user. For example, the user may provide an initial query "Italian food near me" and then provide input indicating that the user has switched between multiple applications over a certain time period. In this example, the context confidence estimator may calculate a low context confidence score based on the additional context data 232 related to the switching between multiple applications.

In some implementations, context confidence estimator 234 may calculate the context confidence score based on an aggregation of multiple context data that positively indicate that the user remains associated with the likely context or negatively indicate that the user has switched to a different likely context. Examples that positively indicate that the user remains associated with the likely context may include data indicating short time lapses between the user query and a user response to a presentation of results to the query, subsequent queries related to or within the same category as the initial query, e.g., "Italian food and pizza". Other examples that negatively indicate that the user has switched to a different likely context may include data indicating that the user has taken a longer time to provide a response to a presentation of results to a query, data indicating that the user has switched to a different topic or interest as suggested by interactions with other applications or resubmitting the initial query with minor changes, indicating that the user was not satisfied with the results of the initial query. The context confidence estimator 234 may also calculate magnitudes of multiple weight factors in determining the context confidence score based on the specific context data. For example, the context confidence estimator 234 may prioritize different context data signals and determine the appropriate magnitudes to up weight or down weight the context data based on prior data indicating successful queries and unsuccessful queues.

The biasing modulator 234 interpolates the selected biasing parameters 228 transmitted from the context selector 220 based on the context confidence score associated with the likely context. For example, the biasing modulator 234 may compare the context confidence score associated with the likely context to a threshold context confidence score value. The biasing modulator 234 may determine, based on comparing the context confidence score associated with the likely context to the threshold context confidence score value, that the likely context does not remain associated with the user. In response to determining that the likely context data does not remain associated with the user, the biasing modular may interpolate the selected language model biasing parameters. For example, the biasing modulator may add decay factors to the selected biasing parameters 228 to decrease the associated probabilities of the parameters or reduce the weights of the biasing parameters in the language model. In some instances, the context confidence score may be so low, that the biasing modulator 230 may transmit a signal to the biasing parameter selector to select a new set of biasing parameters based on the additional context data 232 received. In other instances, biasing modulator 230 may attenuate the probabilities of the selected biasing parameters 228 to generate and transmit a set of modulated biasing parameters 236.

The language model biaser 140 receives the modulated biasing parameters 136 to bias the baseline language model 142. The baseline language model 242 is a set of assigned probabilities to a sequence of n-grams by using a probability distribution. The baseline language model 242 may also be a unigram model, or a positional language model that describes the possibility of given words occurring close to one another within a text. The language model biaser 140 biases the baseline language model 142 by adjusting probabilities associated with words within the language model that increase the chances of being responsive to the user query. For example, the language model biaser 140 may use the modulated biasing parameters to identify certain words or terms that indicate that a user is within a certain context based on the context data associated with the user query. The language model biaser 240 generates a biased language model, which is transmitted to the automatic speech recognition module 250.

The automated speech recognition module 250 receives the biased language model 254 and includes an acoustic model 252. The acoustic model 252 identifies a transcription of speech input provided by a user into a readable text The automatic speech recognition module 250 uses the biased language model 254 to recognize the transcription by the acoustic model 252 and reduce the word error rate predicting tbs transcription is an accurate representation of the speech input.

Figure 3:
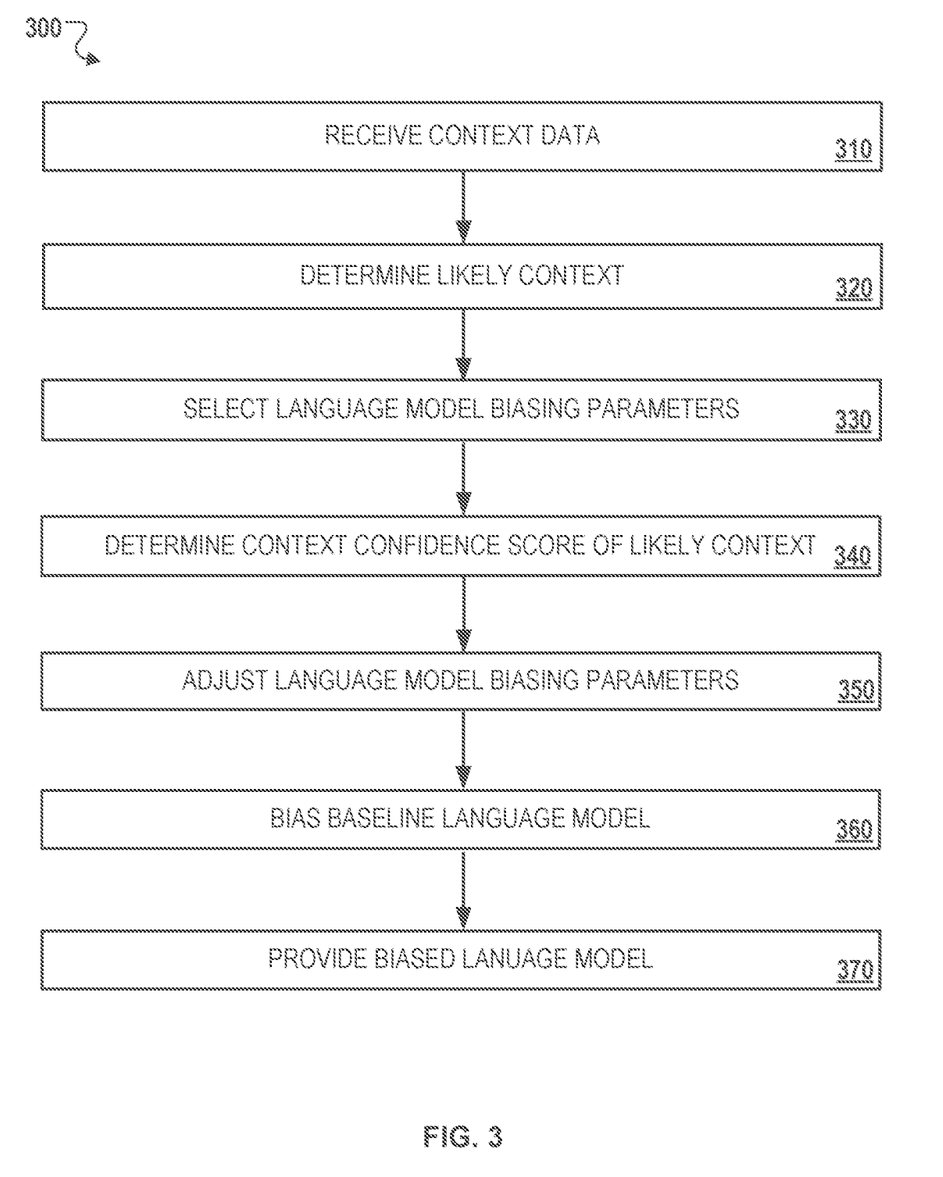
FIG. 3 illustrates an example process for generating a biased language model.

FIG. 3 illustrates an example process 300 for generating a biased language model. Briefly, the system 300 receives context data (310). The system 200 determines a likely context associated with a user based on the context data (320). The system 200 selects language model biasing parameters based on the likely context (330). The system 200 determines a context confidence score associated with the likely context based on the context data (340). The system 200 adjusts the language model biasing parameters based on the context confidence score (350). The system 200 biases a baseline language model based on the adjusted language model biasing parameters (350). The system 200 provides the biased language model for use by an automated speech recognizer (370).

The system 300 receives context data (310). For example, the system 200 may receive a user request through a verbal utterance indicating a search query for locations nearby the user. The system 200 may transcribe the utterance using an automated speech recognition module within the user device. For instance, the user may say "Italian restaurants near me" and the system 200 may use the transcribed words to use a discriminative technique to determine the user context. In this example, the system 200 may determine that the user is searching for food based on the transcription of word "restaurant" and determine that the user is searching for specific types of food based on the word "Italian" to describe a specified cuisine.

The system 200 determines a likely context associated with a user based on the context data (320). For example, based on the received user query described in process step 310, the context selector 220 may determine that the likely context associated with the user is a list of Italian restaurants within a mile of the location of the user device. In this example, the system 200 may determine the likely context by combing the terms within the user query based on a baseline language model that has a predetermined probabilities associated with combinations of words The system 200 selects language model biasing parameters based on the likely context (330). For example, the biasing parameter selector 224 may select a set of biasing parameters 226 based on the determined likely context. For instance, in the example described in process step 320, the biasing parameter selector 224 may select the names of the listed restaurants that are identified as likely context for the user query. The biasing parameter selector 224 determines these biasing parameters based on their association with user query "Italian restaurants near me".

The system 300 determines a context confidence score associated with the likely context based on the context data (340). For example, the context confidence estimator 234 may determine the context confidence score that is indicative of the likelihood of each likely context remains associated with the user. The context confidence estimator 234 may use data indicating user behavior to calculate the context confidence score. For example, the context confidence estimator may use the number of times the user has switches between different applications, scrolling data after providing a query, or the time difference between the user query and a user selection to determine if the context associated with the user has changed, if the data indicating user behavior has changed from the likely context, e.g., resubmitting a query, failing to send a response within a threshold time period, switching between a threshold number of applications, the context confidence estimator 234 assigns a low context confidence score to the likely context. If the data indicating user behavior is within the likely context or has not changed from the likely context, the context confidence estimator 234 assigns a high context confidence score to the likely context.

In some implementations, the context confidence estimator 234 may determine the context confidence score of the likely context based on comparing the selected biasing parameters to verify user query. For example, if a user submits the query "vanilla car, " the biasing parameter selector 224 may select a fist of biasing parameters related to ice cream based on biasing around the transcription "vanilla" and biasing parameters related to transportation based on biasing around the transcription "car". In such an instance, the context confidence estimator 234 may determine that the context confidence score for the likely context is low based on determining that ice cream and transportation are unlikely to represent actual user context.

The system 200 adjusts the language model biasing parameters based on the context confidence score (350). For example, the biasing modulator 230 may receive additional context data 232 to attenuate the selected biasing parameters 228 and generate a set of modulated biasing parameters 236. The biasing modulator 230 may use the additional context data to determine if the user is still within the likely context. In In such examples, the additional context data 232 may include time interval between a user query and user response to a presentation of results, gaze tracking data indicating where the user directs his/her attention on visual content, data indicating that the user has switched between applications, user input indicating that the user has selected one of the presented results, the user has submitted a new search query that indicates that the user has tried to retry the search query with different terms, or combinations of these examples.

In some implementations, adjusting the language model biasing parameters initially includes comparing the context confidence score associated with the likely context to a threshold context confidence score value. The biasing modulator 230 may determine, based on comparing the context confidence score associated with the likely context to the threshold context confidence score value, that the likely context does not remain associated with the user. For example, if the context confidence estimator 234 determines that the selected biasing parameters indicate a low confidence score based on the combination of transcriptions from the user query, the biasing modulator 230 may determine that this below the threshold value and that the user does not remain associated with the user. In response to determining that the likely context data does not remain associated with the user, the biasing modulator 230 may interpolate the selected biasing parameters 228 based on the likely context. For example, if a user provides a search query "vanilla car" and the biasing parameter selector 224 may initially select biasing parameters related to ice cream and transportation. The user may then provide a subsequent search query "vanilla cone", which the biasing modulator 230 may use to determine that the selected biasing parameters related to transportation are no longer relevant based on the user's resubmitted search query. In response, the biasing modulator 230 may attenuate the likelihoods associated with these biasing parameters and/or increase the likelihoods associated with the biasing parameters related to ice cream.

In some implementations, the biasing modulator 234 interpolates the selected biasing parameters using decay factors based on type of additional context data received by the biasing modulator 232. For instance, the biasing modulator 232 may use additional context data indicating the time interval between a user query and user response to a presentation of results to add a decay factor that reduces the biasing parameters proportionally with the increase in time interval. In another instance, the biasing modulator 232 may use context data indicating that the user has switched applications to reduce the biasing parameters by adding decay factor that is certain percentage for each successive application switch. In these examples, the biasing modulator 234 interpolates the selected biasing parameters using specified decay factors that are specific to the types of context data associated with the user and may combine the decay factors with the selected biasing parameters using various algorithmic methods to reduce the associated likelihoods of the biasing parameters.

In other implementations, the biasing modulator 230 may use deactivation thresholds for different types of context data to remove selected biasing parameters altogether. For example, the biasing modulator may set a deactivation threshold for time interval for a user response at one minute. In such an example, if the user take more than a minute to provide a response to an initial query, then the biasing modulator 230 discards the selected biasing parameters and interprets the response as initiating a new search query. In response, the biasing parameter selector may select new biasing parameters that are more relevant to the second search query. In such examples, the deactivation thresholds may vary based on the type of context data, and may interact with other deactivation thresholds of other context data to create an additive or multiplicative impact on the biasing parameters. For instance, if the deactivation thresholds for switching applications is four switches, and the deactivation threshold for time interval is 30 seconds, the biasing modulator 230 may remove the selected biasing parameters if the user has spent 20 seconds and has switched between three applications.

The system 200 biases a baseline language model based on the adjusted language model biasing parameters (360). For example, the biasing modulator 230 provides a set of modulated biasing parameters 235 to the language model biaser 240, which includes a baseline language model 242. In such examples, the modulated biasing parameters 236 are based on the likely context associated with the user selected by the context selector 220 and are modulated by the biasing modulator 230 based on the context confidence score calculated context confidence estimator 234. The modulated biasing parameters 236 are used to control the biasing of the baseline language model to enhance the responsiveness to a user query.

In one example, the modulated biasing parameters 236 are used by the language model biaser 240 to positively bias the baseline language model 242. For example, if a user provides a search query "Italian restaurants near me", in response the system 200 may present a list of ten results including "John's pizzeria", "Paolo Trattoria". The context language model biaser concurrently prepares a baseline language model 242, and the biasing parameter selector selects biasing parameters based on the restaurant names of the displayed results. If the user provides a voice command stating "John's pizzeria" within a 30 second time interval, then the biasing modulator 230 determines, based on such additional context data, that the selected biasing parameters related to "John's pizzeria" have a relatively high context confidence score, and allows the language model biaser 240 to bias the baseline language model 242 using the biasing parameters based on the restaurant names of the displayed results.

In another example, the modulated biasing parameters 236 are used by the language model biaser 240 to negatively bias the baseline language model 242. For example, in response to the list of restaurants discussed above, the user may change applications on the user device, and provide a subsequent response two minutes after being presented with the list of restaurants. In this example, the biasing modulator may determine, based on the additional context data such as the response time and the application switching, that the context confidence score of the biasing parameters based on the restaurant names is low enough to suggest that the user is no longer within the context of the initial search query. In response, the biasing modulator 230 may either deactivate biasing by the language model biaser 240 based on the selected biasing parameters or prepare new set of biasing parameters based on the second search query submitted, or a combination of both.

The system 300 provides the biased language model for use by an automated speech recognizer (370). For example, the language model biaser provides a biased language model 254, using the modulated biasing parameters 236 to bias a baseline language model 242, to an acoustic model 252 within an automated speech recognition module 250. For instance, the biased language model 255 may include the baseline language model with biasing components that provide indications whether to bias phrases received by the acoustic model using the language model. The biasing components may represent probabilities/likelihoods, or weights associated with certain words of phrases based on the modulated biasing parameters 236.

In some implementations, the biased language model 254 includes attenuated probabilities for certain words or phrases within the baseline language model 242 based on the likely user context determined by the context selector 220, and modulated by the biasing modulator 230. For example, if a user submits an initial search query "Italian restaurants", and subsequently submits an ambiguous search query with the utterances "PE-EH-SA PA-AH-IE", the biasing modulator may attenuate certain probabilities within the baseline language model 242 based on the context data provided by the user. For instance, if the user provides a quick response and selects an option for an Italian restaurant, the biased language model may have increased probabilities for words related to Italian food such as "pizza". However. if the user provides a slow response, and/or interacts with other applications or content, e.g., scrolling between the page, switching between applications, the biased language may have decreased probabilities for words related to Italian food based on a determination by the biasing modulator 230 that the user is no longer within the context of italian food. In such an example, the utterance may transcribed by the acoustic model 250 using the baseline language model, which may lead the automated speech recognition 250 to transcribe the user's utterance as "piece of pie".

Figure 4:
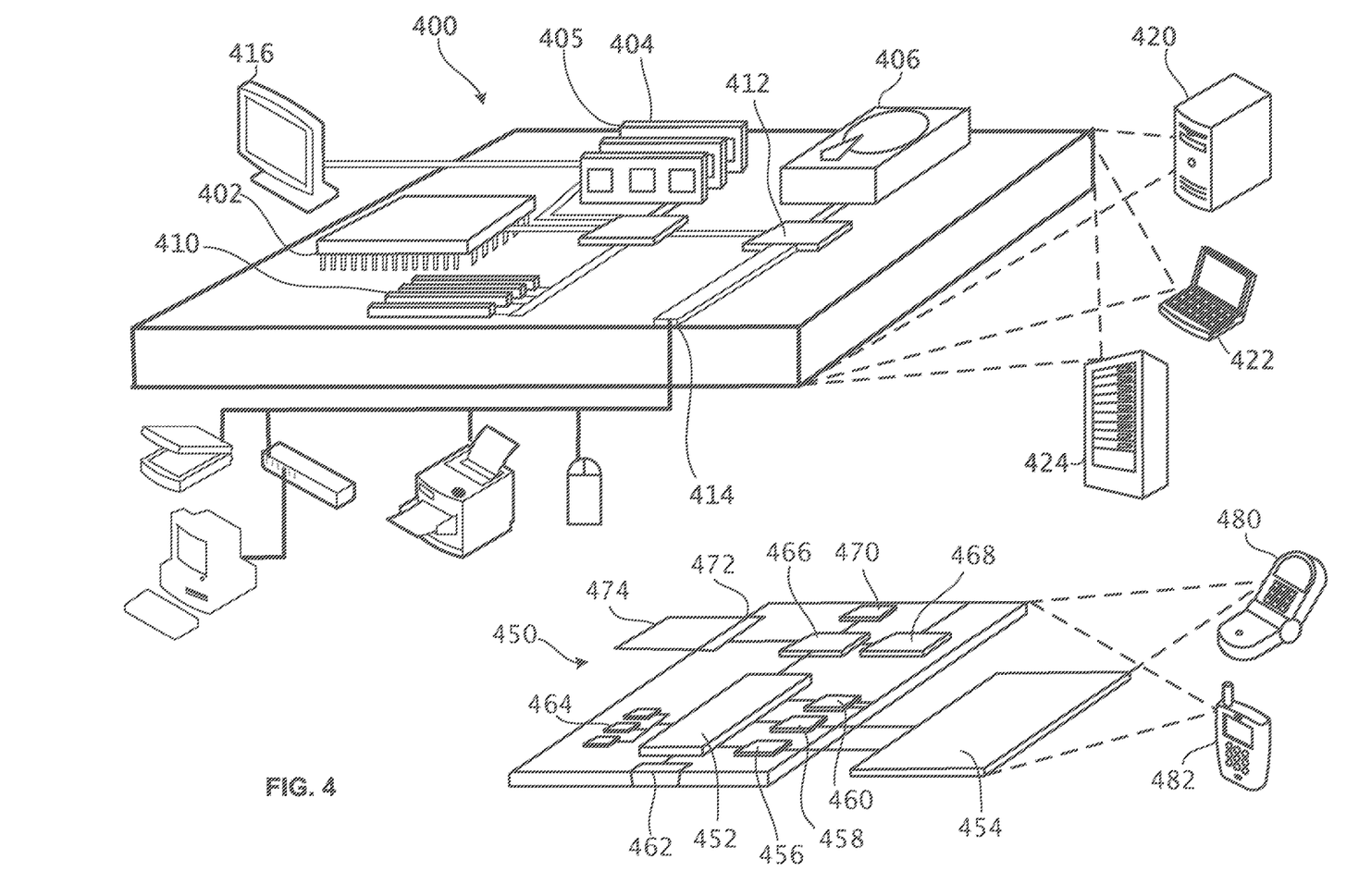
FIG. 4 is a block diagram of computing devices on which the processes described herein, or potions thereof, may be implemented.

FIG. 4 is a block diagram of computing devices that may be used to implement the systems and methods described in this document, as either a client or as a server o plurality of servers.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 408. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or cm the storage device 406 to display graphical information for a GUI on an external input/output device, such as display 416 coupled to high speed interface 408. In other implementations, multiple processors and/or multiple buses may be used as appropriate, along with multiple memories and types of memory. Also. multiple computing devices 400 may be connected, with each device providing portions of the necessary operations, e.g., as a server bank, a group of blade servers, or a multi-processor system.

The memory 404 stores information within the computing device 400 in one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400 In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth intensive operations. Such allocation of functions is exemplary only in one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth,6 Ethernet, wireless Ethernet may be coupled to one or more input/output devices, such as a keyboard, a pointing device, microphone/speaker pair, a scanner, or a networking device such as a switch or router, e.g., through a network adapter. The computing device 400 may be implemented in a number of different forms, as shown in the figure. For example it may be implemented as a standard server 420 or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400. 450, and an entire system may be made up of multiple computing devices 400, 450 communicating with each other.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, and an input/output device such as a display 454 a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450. including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition. GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information Audio codec 460 may likewise generate audible sound for a user, such as through a speaker, e.g., in a handset of device 450. Such sound may include sound from voice telephone calls, may include recorded sound, e.g., voice messages, music files, etc. and may also include sound generated by applications operating on device 460.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which may be special or general purpose, coupled to receive data and instructions from, and to transmit data and instructions to a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory. Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network Examples of communication networks include a local area network ("LAN"), a wide area network ("WAN"), and the Internet.

The computing system can include clients and servers A client and server are generally remote from each other and typically interact through a communication network. The relationship of client and server arises by virtue of computer programs running on the respective computers and having a client-server relationship to each other A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving at a user device associated with a user audio data corresponding to a voice query spoken by the user;
   processing, by the user device, using a language model, the audio data corresponding to the voice query spoken by the user to determine a particular context associated with biasing the language model, the particular context associated with biasing the language model based on a type of words used in the voice query;
   selecting by the user device, a set of biasing terms based on the particular context associated with biasing the language model; and
   biasing, by the user device, using the set of biasing terms, the language model to increase a likelihood of recognizing biasing terms from the set of biasing terms in the audio data.

2. The method of claim 1, wherein the particular context associated with biasing the language model is further based on a number of words used in the voice query.

3. The method of claim 1, further comprising providing, by the user device, the biased language model to an automated speech recognition module, the automated speech recognition module comprising an acoustic model configured to generate readable text from speech inputs spoken by the user.

4. The method of claim 1, wherein using the set of biasing terms to bias the language model causes the biased language model to identify certain words or terms indicating that the user is within the particular context.

5. The method of claim 1, further comprising, after biasing the language model:

receiving, at the user device, additional audio data corresponding to an utterance spoken by the user;
   determining, by the user device, that, when the additional audio data was received the particular context associated with biasing the language model is no longer applicable: and
   in response to determining that the particular context associated with biasing the language model is no longer applicable, returning, by the user device, the biased language model to a baseline state.

6. The method of claim 5, wherein determining the particular context associated with biasing the language model is no longer applicable comprises determining that the user that spoke the utterance is likely associated with another context that is inconsistent with the particular context.

7. The method of claim 5, wherein determining the particular context associated with biasing the language model is no longer applicable comprises determining that a confidence score associated with the particular context does not satisfy a threshold.

8. The method of claim 7, wherein the context confidence score reflects a likelihood that the particular context associated with biasing the language model is applicable.

9. The method of claim 1, further comprising, after biasing the language model, generating, by the user device, using the biased language model, a transcription of the received audio data corresponding to the voice query spoken by the user.

10. The method of claim 1, wherein the language model indicates scores associated with different n-gram sequences.

11. A user device comprising:
    data processing hardware; and
    memory hardware in communication with the data processing hardware and storing instructions that when executed on the data processing hard-ware cause the data processing hardware to perform operations comprising:
       receiving audio data corresponding to a voice query spoken by a user
       processing using a language model, the audio data corresponding to the voice query spoken by the user to determine a particular context associated with biasing the language model, the particular context associated with biasing the language model based on a type of words used in the voice query:
       selecting a set of biasing terms based on the particular context associated with biasing the language model; and
       biasing, using the set of biasing terms, the language model to increase a likelihood of recognizing biasing terms from the set of biasing terms in the audio data.

12. The user device of claim 11, wherein the particular context associated with biasing the language model is further based on a number of words used in the voice query.

13. The user device of claim 11, wherein the operations further comprise providing the biased language model to an automated speech recognition module, the automated speech recognition module comprising an acoustic model configured to generate readable text from speech inputs spoken by the user.

14. The user device of claim 11, wherein using the set of biasing terms to bias the language model causes the biased language model to identify certain words or terms indicating that the user is within the particular context.

15. The user device of claim 11, wherein the operations further comprise, after biasing the language model:

receiving additional audio data corresponding to an utterance spoken by the user;

determining that, when the additional audio data was received, the particular context associated with biasing the language model is no longer applicable; and in response to determining that the particular context associated with biasing the language model is no longer applicable, returning the biased language model to a baseline state.

16. The user device of claim 15, wherein determining the particular context associated with biasing the language model is no longer applicable comprises determining that the user that spoke the utterance is likely associated with another context that is inconsistent with the particular context.

17. The user device of claim 15, wherein determining the particular context associated with biasing the language model is no longer applicable comprises determining that a confidence score associated with the particular context does not satisfy a threshold.

18. The user device of claim 17, wherein the context confidence score reflects a likelihood that the particular context associated with biasing the language model is applicable.

19. The user device of claim 11, wherein the operations further comprise, after biasing the language model, generating, using the biased language model, a transcription of the received audio data corresponding to the voice query spoken by the user.

20. The user device of claim 11, wherein the language model indicates scores associated with different n-gram sequences.

* * * * *